United States Patent
Griffin et al.

(10) Patent No.: US 12,470,454 B2
(45) Date of Patent: Nov. 11, 2025

(54) ON-DEMAND UNIKERNEL FOR APPLICATION PROTECTION

(71) Applicant: Red Hat, Inc., Raleigh, NC (US)

(72) Inventors: Leigh Griffin, Waterford (IE); Luigi Mario Zuccarelli, Milan (IT); Sherine Khoury, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 44 days.

(21) Appl. No.: 18/369,074

(22) Filed: Sep. 15, 2023

(65) Prior Publication Data

US 2025/0097095 A1 Mar. 20, 2025

(51) Int. Cl.
*H04L 41/0604* (2022.01)
*H04L 41/0663* (2022.01)
*H04L 45/28* (2022.01)

(52) U.S. Cl.
CPC ...... *H04L 41/0627* (2013.01); *H04L 41/0663* (2013.01); *H04L 45/28* (2013.01)

(58) Field of Classification Search
CPC . H04L 41/0627; H04L 41/0663; H04L 45/28; G06F 9/455; G06F 11/1448
See application file for complete search history.

(56) References Cited

U.S. PATENT DOCUMENTS

| | | | | |
|---|---|---|---|---|
| 4,750,116 A | * | 6/1988 | Pham | G06F 3/16 719/321 |
| 7,146,260 B2 | * | 12/2006 | Preston | G06F 13/4081 340/3.1 |
| 7,275,121 B1 | * | 9/2007 | Wong | G06F 9/526 710/240 |
| 9,268,542 B1 | * | 2/2016 | Mars | G06F 9/5016 |
| 9,794,287 B1 | * | 10/2017 | Koster | G06F 21/552 |
| 9,954,757 B2 | * | 4/2018 | Hyser | H04L 47/78 |
| 10,547,521 B1 | * | 1/2020 | Roy | H04L 43/06 |
| 10,664,325 B1 | * | 5/2020 | Radack | G06F 9/4881 |
| 10,728,121 B1 | * | 7/2020 | Chitalia | H04L 41/12 |
| 10,868,742 B2 | * | 12/2020 | Chitalia | G06F 11/3452 |
| 11,068,314 B2 | * | 7/2021 | Roy | G06F 9/455 |
| 11,277,315 B2 | * | 3/2022 | Patel | H04L 41/122 |
| 11,323,327 B1 | * | 5/2022 | Chitalia | H04L 63/102 |
| 2017/0277607 A1 | * | 9/2017 | Samii | G06F 11/2033 |
| 2020/0097309 A1 | * | 3/2020 | Chopra | G06F 9/455 |
| 2020/0341852 A1 | * | 10/2020 | Chopra | G06F 11/1451 |
| 2021/0112017 A1 | * | 4/2021 | Gupta | H04L 41/0816 |
| 2022/0306135 A1 | * | 9/2022 | Hamann | G06F 9/5027 |
| 2022/0405170 A1 | * | 12/2022 | Kumar | G06F 3/0482 |
| 2025/0045467 A1 | * | 2/2025 | Holla | G06F 21/78 |

\* cited by examiner

*Primary Examiner* — Muhammad Raza
(74) *Attorney, Agent, or Firm* — Womble Bond Dickinson (US) LLP

(57) ABSTRACT

Embodiments of the present disclosure relate to systems and methods for using unikernels to protect critical safety applications from interference events. For each of a set of applications identified as critical to the functioning of a computing environment, a corresponding unikernel may be generated, the unikernel including code of the application and kernel functionality. In response to determining that an interference event is affecting a first application of the set of applications, it is determined whether the interference event is unsustainable. In response to determining that the interference event is unsustainable, the unikernel corresponding to the first application is initiated and a failover from the first application to the unikernel corresponding to the first application is performed.

17 Claims, 6 Drawing Sheets

ON-DEMAND UNIKERNEL FOR APPLICATION PROTECTION

TECHNICAL FIELD

The present disclosure relates generally to software technology, and more particularly, to systems and methods of ensuring that critical safety applications and services can execute free from interference caused by user applications or other interference sources by utilizing unikernel functionality.

BACKGROUND

Modern vehicles (e.g., automotive vehicles, marine vehicles, railed vehicles, aircraft vehicles, etc.) include computing systems that can execute one or more applications (e.g., software, computer code) to provide a variety of different critical services for managing the critical operations of the vehicle and a variety of user-services for enhancing the driving experience for the users (e.g., driver and passengers) of the vehicle. The automotive industry has a strong requirement for functional safety, and for this reason, the automotive industry classifies the applications that execute on the vehicle's computing system as being either safety-related applications (sometimes referred to as, functional safety application) or not safety-related (sometimes referred to as, user application). For example, a safety-related application might control the movement (e.g., acceleration, velocity, breaking, and/or steering) of the vehicle, while a user application might control the air conditioning in the cabin of the vehicle or provide navigational directions for the driver.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
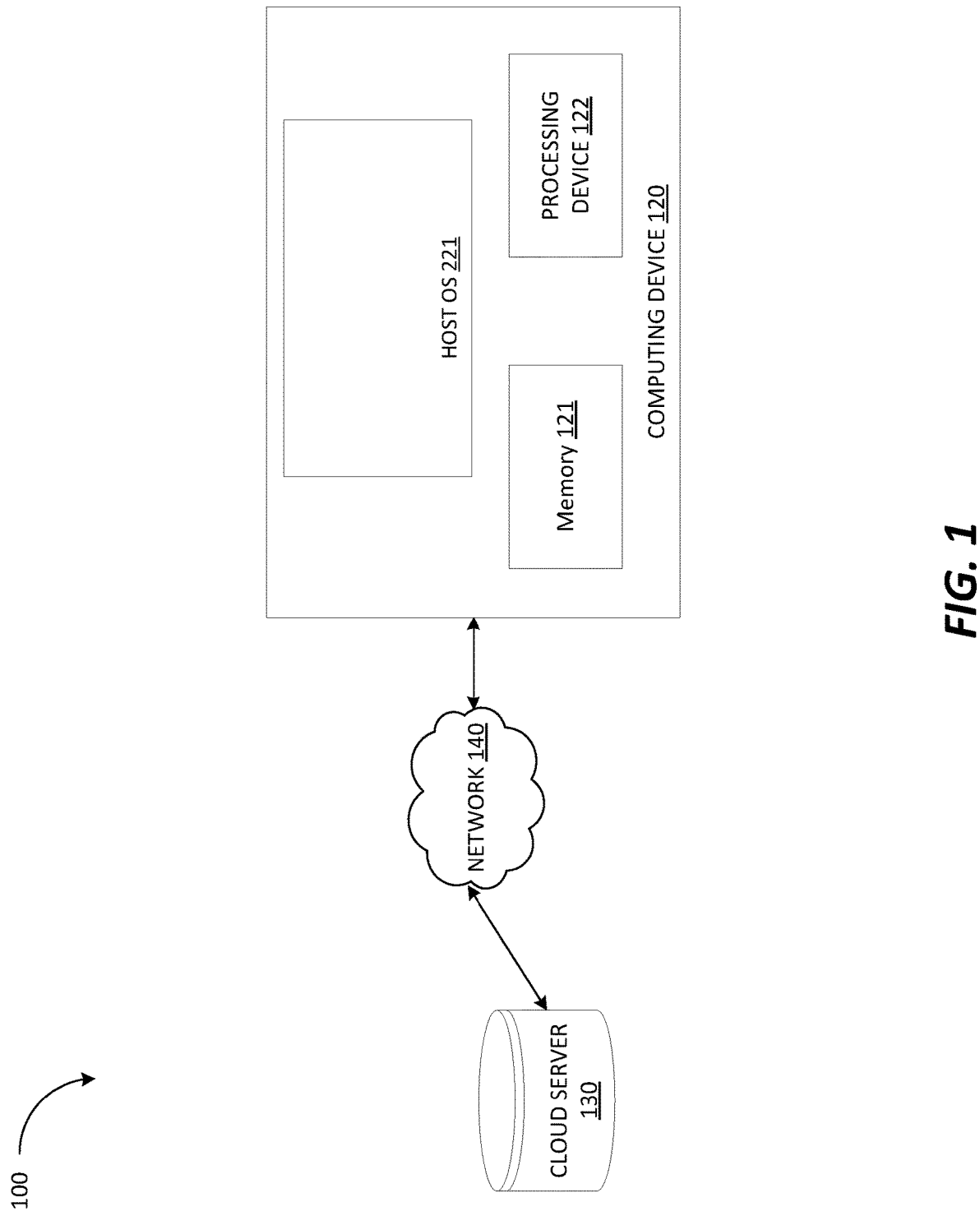
FIG. 1 is a block diagram depicting an example environment in which unikernel functionality may be used to ensure that critical safety applications can execute free from interference caused by user applications or other interference sources, according to some embodiments of the present disclosure.

Vehicle manufacturers struggle to ensure that their safety-related applications can freely operate without interference caused by other applications (e.g., user applications) or unauthorized intrusion, which could pose a threat to the overall safety of the vehicle. While a vehicle manufacturer can test the safety-related applications at the time of installation, the vehicle manufacturer does not know which user applications (or combination of user application) that the user will later install on the vehicle's computing system and how they will affect the functioning of the safety-related applications/what kind of interference events they will cause. Nor can the vehicle manufacturer anticipate unauthorized intrusions and how they will affect the functioning of the safety-related applications/what kind of interference events they will cause. For this reason, the vehicle manufacturer cannot test for or implement counter-procedures to prevent a user-installed application or unauthorized intrusion from interfering with the pre-installed safety-related applications. Thus, there is a long felt need to solve problems related to ensuring that the safety-related applications that are executing on a vehicle's computing system are free from interference that is caused by other user-applications or unauthorized intrusion.

An interference event involves the system resources (e.g., processing, memory, networking) of the vehicle that are allocated to a safety application, such that the interference event degrades the performance of the safety application by interfering with its allocated resources. The interference event, for example, may be a memory out-of-bounds access error, an execution timing error, a memory allocation collision error, or a memory corruption error among others.

A unikernel is a single bootable image consisting of user code linked with additional components that provide kernel-level functionality, such as opening files. The resulting program can boot and run on its own as a single process, in a single address space, and at an elevated privilege level without the need for a conventional operating system. Because unikernels run a single process in a single address space, they are protected from interference from other applications/interference sources.

Aspects of the present disclosure address the above-noted and other deficiencies by providing a mechanism for identifying critical safety applications and for each safety application identified as critical, generating a corresponding unikernel. Each of the critical safety applications are monitored to detect when an interference event is affecting a critical safety application. If an interference event is affecting a critical safety application, it is determined whether the interference caused by the interference event is unsustainable. In response to determining that the interference caused by the interference event is unsustainable, a unikernel corresponding to the critical safety application may be initiated and a graceful failover from the critical safety application to the corresponding unikernel may be performed, including routing traffic to the unikernel and shutting down the original safety-related application. In this way, the safety-related application can execute in a safe and secure environment that is free from interference as unikernels are single namespaces that are protected from outside interference by design.

FIG. 1 is a block diagram depicting an example environment 100 in which some embodiments of the present disclosure may be implemented. Environment 100 includes a computing device 120, a cloud service 130, and a network 140. The computing device 120 and the cloud service 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and cloud service 130. The computing device 120 and cloud service 130 may include hardware such as processing device 122 (e.g., processors, central processing units (CPUs), memory 121 (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and cloud service 130 may each comprise any suitable type of computing device or machine that has a programmable processor including, for example, server computers, desktop computers, laptop computers, tablet computers, smartphones, set-top boxes, etc. In some examples, the computing device 120 and cloud service 130 may each comprise a single machine or may include multiple interconnected machines (e.g., multiple servers configured in a cluster). The computing device 120 and cloud service 130 may be implemented by a common entity/organization or may be implemented by different entities/organizations. For example, computing device 120 may be operated by a first company/corporation and cloud service 130 may be operated by a second company/corporation. The computing device 120 and cloud service 130 may each execute or include an operating system (OS), as discussed in more detail below. The OSs of computing device 120 (shown in FIG. 1 as host OS 221) and cloud service 130 may manage the execution of other components (e.g., software, applications, etc.) and/or may manage access to the hardware (e.g., processors, memory, storage devices etc.) of their respective computing device.

Figure 2:
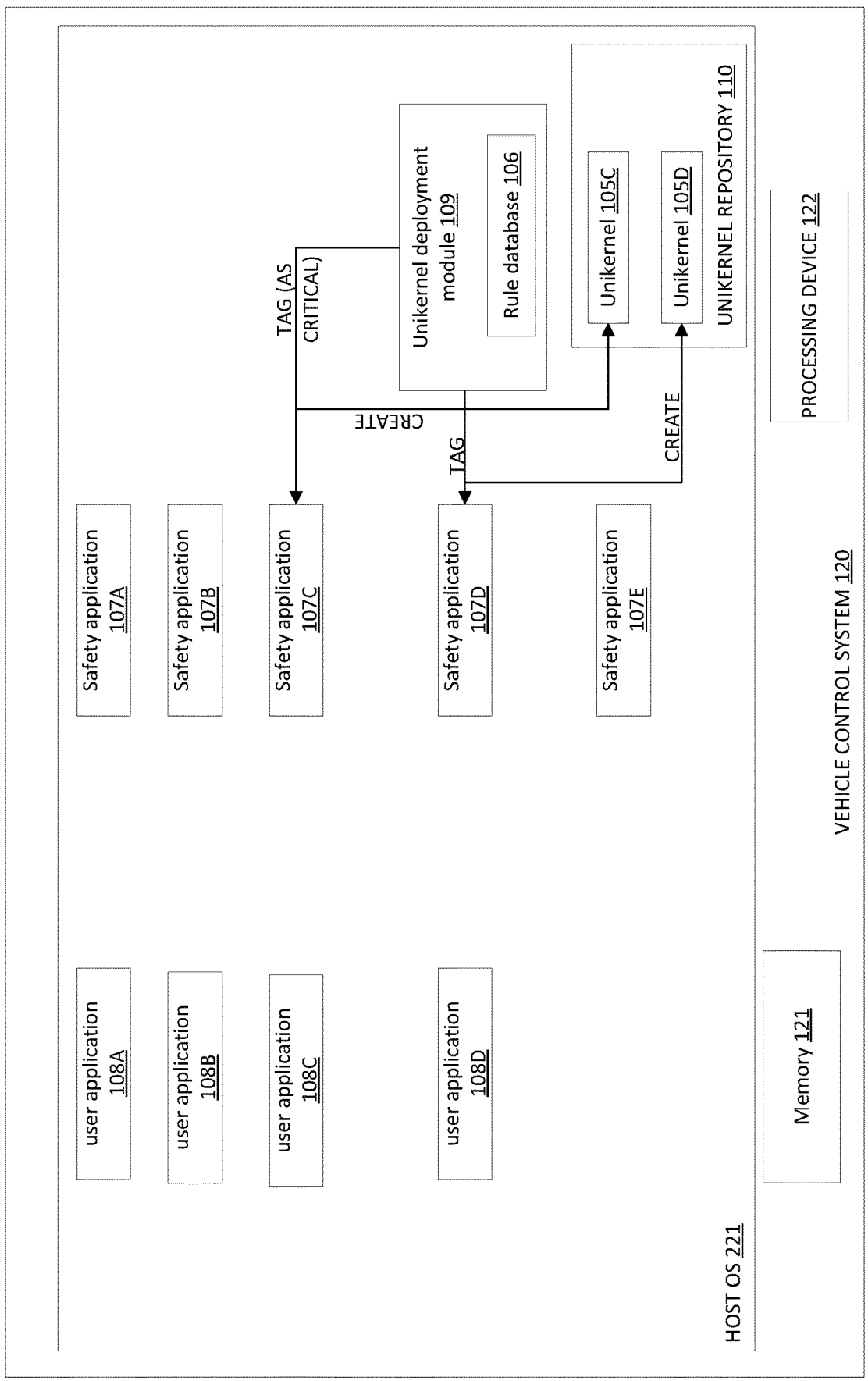
FIG. 2 is a detailed block diagram of the vehicle illustrated in FIG. 1, illustrating unikernel generation, according to some embodiments of the present disclosure.

FIG. 2 illustrates the environment 100 implementing techniques for ensuring that critical safety applications and services can execute free from interference caused by user applications or other interference sources by utilizing uni-kernel functionality, according to embodiments of the present disclosure. As discussed herein, the computing device 120 may be a vehicle's control system (and may be referred to as vehicle control system 120 hereinafter), and the host OS 221 (via the processing device 122) may execute one or more functional safety applications 107 (hereinafter referred to as "safety applications 107") and one or more user applications 108. Each of the safety applications 107 and the user applications 108 may be stored as a software module in the memory 121 and executed by the processing device 122 to perform their corresponding function. A safety application 107 may be an application that is configured to control the movement (e.g., acceleration, velocity, breaking, and/or steering) of the vehicle. For example, a safety application 107 may be configured to receive vehicle feedback data from other components of the vehicle (not shown) such as the steering wheel and brakes and generate critical vehicle instructions based on the vehicle feedback data. The safety application 107 may send the critical vehicle instructions to the other components of the vehicle to control the position and movement of the vehicle. One or more of the safety applications 107 may be part of a safety standard such as FuSa (ISO 26262). A user application 108 may be any application that is not safety-related, such that it does not control the movement of the vehicle. A user application 108 may, for example, be a music application, a movie application, a video game application, an internet application (e.g., a web browser), a navigational application (e.g., GPS maps), a telephone application, or a heating/ventilation/air conditioning (HVAC) application for the vehicle cabin, etc.

When the processing device 122 executes a safety application 107, the processing device 122 initially determines a first amount of system resources required to execute the safety application 107. For example, the processing device 122 may determine that the safety application 107 can execute (error-free) using 1 CPU core with 2 threads, 100 megabytes of memory space, and a network port with 5 megabits per second (Mbps) of network bandwidth. The processing device 122 then allocates, based on the first amount of system resources, a first portion (e.g., a memory address space, a network port, and/or a network bandwidth) of the system resources to be used by the safety application 107. Likewise, when the processing device 122 executes one of the user applications 108, it may initially determine a second amount of system resources required to execute the user application 108. The processing device 122 may then allocate, based on the second amount of system resources, a second portion of the system resources to be used by the user application 108.

However, when the processing device 122 simultaneously executes the safety application 107 and the user application 108, the user application's 108 use of its respective allocated system resources can create an interference event associated with the allocated resources of the safety application 107. This interference event can degrade the performance of the safety application 107, such as a capability to acquire feedback data from other components of the vehicle, a capability to generate critical vehicle instructions based on the feedback data, and/or a capability to send the critical vehicle instructions to the other components of the vehicle to manage the movement of the vehicle. For example, while executing the safety application 107 to determine steering instructions for the steering wheel of the vehicle, the processing device 122 could simultaneously execute the user application 108 to determine route/navigation guidance. The execution of the user application 108 may introduce an additional delay (e.g., 30 seconds, 60 seconds) in how long it takes for the processing device 122 to determine steering instructions for the steering wheel of the vehicle based on e.g., vehicle feedback data and send the steering instructions back to the steering wheel of the vehicle (not shown). In another example, if the user application 108 is sending/receiving communication from the steering wheel (or any other component) of the vehicle, then this could also create a networking bottleneck (e.g., network congestion) that could further delay the time it takes for the safety application 107 to send the steering instructions back to the steering wheel of the vehicle. In other words, these interferences are due to the interference events or interactions that might occur between the resources that are allocated to the safety application 107 and the resources that are allocated to the user application 108. Examples of interference events may include memory out-of-bounds access errors, execution timing errors, memory allocation collision errors, memory corruption errors, or network bottlenecks (e.g., congestion), among others.

The host OS 221 may also execute (via the processing device 122) a unikernel deployment module 109 to perform the functions described herein. The unikernel deployment module 109 may provide a tagging functionality to allow a user (e.g., a driver of the vehicle) to tag safety applications 107 that are of critical importance to the safe functioning of the vehicle and thus require unikernel backup functionality, as discussed in further detail herein. In some embodiments, the tagging functionality allows the user to tag safety applications 107 that are part of a safety standard as discussed hereinabove. The tagging functionality may be implemented in any appropriate way using known techniques. For each safety application 107 that is tagged, the unikernel deployment module 109 may generate a corresponding unikernel 105 and store the generated unikernel 105 in the unikernel registry 110. The unikernel registry 110 may be any appropriate repository used to store and access unikernels. Although illustrated as being implemented locally on the vehicle control system 120, the unikernel registry 110 can be implemented remotely as well, e.g., on cloud service 130. The unikernel registry 110 may allow the unikernel deployment module 109 to store unikernel images and share them out via a process of uploading (pushing) unikernels to the unikernel registry 110 and downloading (pulling) the unikernels into a system.

Each unikernel 105 may comprise a single bootable image consisting of code of the corresponding safety application 107 linked with additional components that provide kernel-level functionality, such as opening files. Each unikernel 105 may have a small footprint e.g., less than 5 MB. The resulting program can boot and run on its own as a single process in a single address space, and at an elevated privilege level without the need for a conventional operating system. Because the safety application functionality and kernel components are integrated into a single address space, the unikernel does not require context switching between the user space and kernel space, and thus provides a lightweight solution resulting in significant performance gains such as faster boot time. Because unikernels are only capable of running a single application in a single address space, they benefit from a low attack surface since they are protected from interference from user applications 108 or malicious users.

As shown in FIG. 2, a user (via the tagging functionality provided by the unikernel deployment module 109) may tag safety applications 107D and 107E, identifying them as critical safety applications. In response, the unikernel deployment module 109 may generate unikernels 105D and 105E corresponding to tagged safety applications 107D and 107E respectively. The unikernel deployment module 109 may store the unikernels 105D and 105E into the unikernel registry 110. As shown in FIG. 2, there is a one-to-one mapping between tagged safety applications 107 and unikernels 105. Stated differently, for each safety application 107 that is tagged, a corresponding unikernel is generated by the unikernel deployment module 109. In some embodiments, each unikernel 105 may comply with minimum functionality requirements specified by the safety standard for the functionality of the corresponding safety application 107. For example, the tagged safety application 107D may perform a particular braking related functionality. Thus, the unikernel 105D may comply with functionality and performance requirements specified by the safety standard for the particular braking related functionality.

Often, a safety application 107 may depend on one or more other safety applications 107, each of which may in turn depend on other safety applications. In this way, the safety application 107 may be thought of as having a chain of dependencies. In some embodiments, if a safety application 107 that has a chain of dependencies is tagged as critical, the unikernel deployment module 109 may generate a unikernel based on all the safety applications in that safety application 107's chain of dependencies.

The unikernel deployment module 109 may monitor the resource usage of each safety application 107 to determine when a particular safety application 107 is experiencing an interference event. It should be noted that as used herein, an interference event may correspond to a single interference event or to a series of interference events (e.g., a series of memory allocation collision errors). The unikernel deployment module 109 may also include a rule database 106 which may include rules for determining when an interference event affecting a tagged safety application 107 is unsustainable (which in some embodiments may correspond to an infringement of a safety standard that the safety applications 107 are part of). Each of the rules in the rule database 106 may comprise magnitude and/or frequency threshold(s) associated with a type of interference event. As discussed herein, an interference event can correspond to interference with an application's usage of any type of system resource (e.g., processing, memory, networking resources). For example, rules may include thresholds corresponding to: a number of execution timing errors (type) per unit of time (frequency), a number of memory errors (e.g., out-of-bounds access errors, memory corruption errors, memory allocation collision errors) per unit of time, or a volume of memory being consumed per unit of time. Another type of interference event can be exceptions at the I/O level, and thus some rules may include thresholds regarding e.g., a number of disk I/O requests per unit of time, among others. When an interference event affecting a tagged safety application 107 exceeds the threshold(s) specified by a rule, the unikernel deployment module 109 may determine that the interference event is unsustainable.

It is desirable to avoid "false alarm" situations where, instead of being caused by a user application 108 or malicious user, an interference event is caused by a system error such as bad timing of a scheduler resulting in a scheduling overlap between two applications attempting to access a system resource. Interference events caused by system errors often are associated with lower levels of interference that will not impact a safety application 107 or levels of interference that a safety application 107 can recover from. Thus, interference events caused by system errors often do not require instantiation of a unikernel. However, the use of rules that employ a single threshold may not provide sufficient sensitivity to identify the distinction between interference events caused by system errors and those caused by a user application 108 or a malicious user. Thus, in some embodiments, each rule in the rule database 106 may include multiple thresholds corresponding to different interference levels. For example, if an interference event affecting a tagged safety application 107 exceeds only a first threshold of a rule, this may indicate an interference event where the level of interference may not affect the tagged safety application 107 or where the level of interference is such that the tagged safety application 107 can recover. If, however, the interference event affecting the tagged safety application 107 exceeds a second threshold of the rule, this may indicate an interference event having a level of interference that may compromise the functioning of the tagged safety application 107 (e.g., the tagged safety application 107's ability to access resources) and that the tagged safety application 107 cannot recover from. Thus, in response to determining that the interference event affecting the tagged safety application 107 exceeds the second threshold of the rule, the unikernel deployment module 109 may initiate a unikernel 105 corresponding to the tagged safety application 107, as discussed in further detail herein. It should be noted that each rule may have any appropriate number of thresholds which may be different than the number of thresholds utilized by other rules.

The unikernel deployment module 109 may also adjust the sensitivity of the threshold(s) for each or a subset of the rules. Such adjustments may be made based on a number of factors including historical driving patterns of the vehicle, the current conditions of the vehicle (e.g., driving in rain, driving on a steep road), and current traffic conditions. Sensitivity adjustments can be applied on a per car, per scenario basis. In some embodiments, the sensitivity of the threshold(s) for each or a subset of the rules can be adjusted remotely by the cloud service 130. For example, the cloud service 130 can receive information regarding geolocation specific conditions such as traffic, weather, or other conditions. Based on this, the cloud service 130 can remotely update the sensitivity of the threshold(s) for one or more rules in the rule database 106. In another example, the cloud service 130 can receive information indicating a certain brand of vehicle has been the target of intrusion attacks by malicious users at a much higher rate over the past e.g., 24 hours. If the vehicle is of the certain brand, the cloud service 130 may update the sensitivity of the threshold(s) for one or more rules in the rule database 106 correspondingly (e.g., may lower the thresholds to implement a stricter standard).

Figure 3:
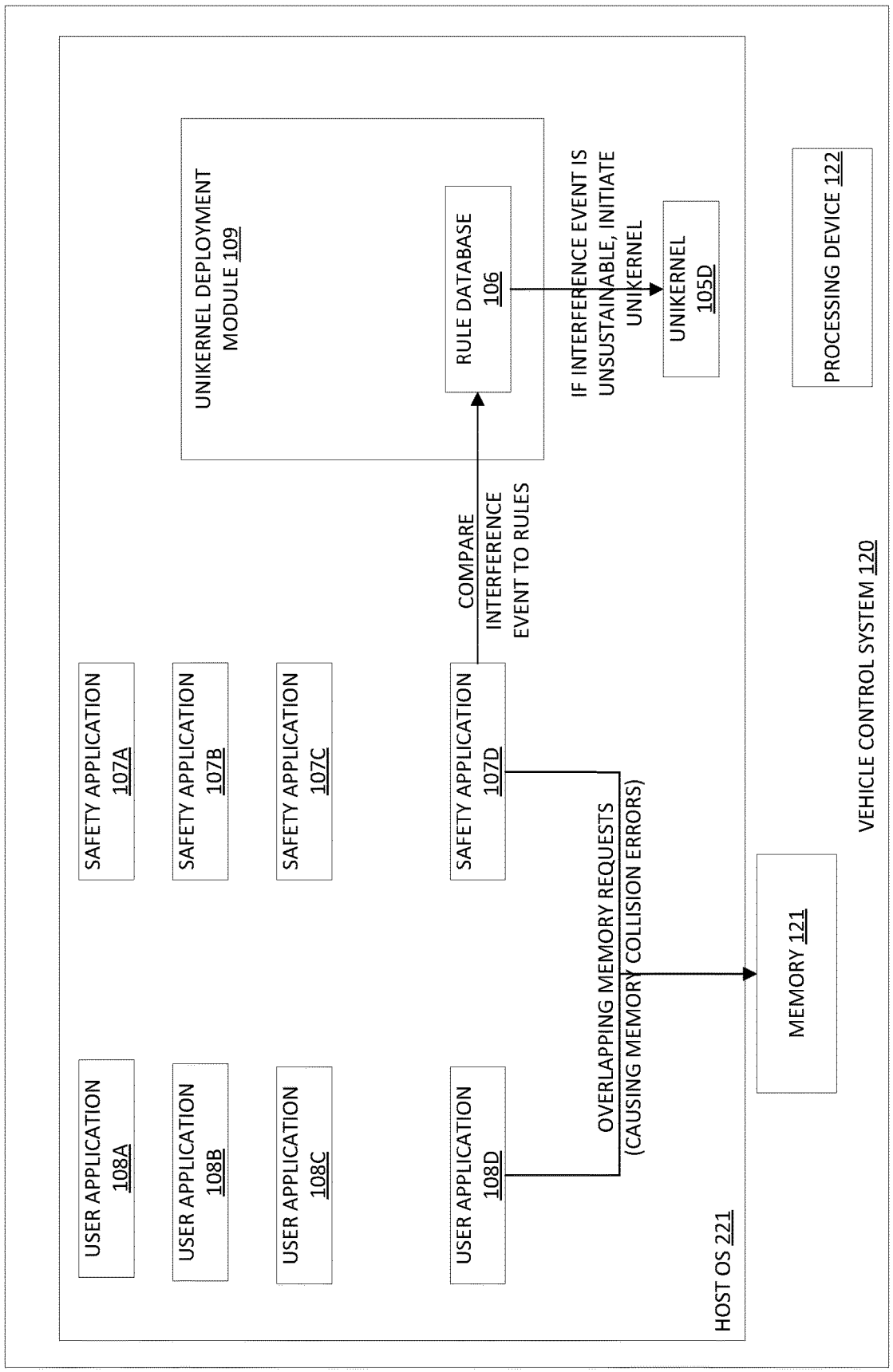
FIG. 3 is a detailed block diagram of the vehicle illustrated in FIG. 1, illustrating identification of an unsustainable interference event and initialization of a unikernel, according to some embodiments of the present disclosure.

In response to determining that an interference event affecting a tagged safety application 107 has exceeded the threshold(s) of one or more rules, the unikernel deployment module 109 may initiate the corresponding unikernel 105 and perform a graceful failover from the tagged safety application 107 to the corresponding unikernel 105. FIG. 3 continues the example of FIG. 2, and illustrates an example process of determining that a tagged safety application 107D is experiencing an interference event that is unsustainable and failing over to a corresponding unikernel 105D.

As shown in FIG. 3, user application 108D may begin interfering with the memory usage of safety application 107D (which has been tagged as discussed herein) such that the safety application 107D experiences a large number of memory allocation collision errors. The unikernel deployment module 109 may compare the number of memory allocation collision errors that the safety application 107D has experienced in a particular unit of time to a first rule of the rule database 106 that specifies first and second thresholds for number of memory allocation collision errors that may occur within the particular unit of time. The unikernel deployment module 109 may determine that the safety application 107D has experienced a number of memory allocation collision errors within the particular unit of time that exceeds both the first and second thresholds of the first rule, and thus is experiencing an interference event that is unsustainable.

In response to determining that the safety application 107D is experiencing an interference event that is unsustainable, the unikernel deployment module 109 may initiate the corresponding unikernel 105D. In some embodiments, initiating the unikernel 105D may include downloading it from the unikernel registry 110, and installing/executing it on the host OS 221.

Figure 4:
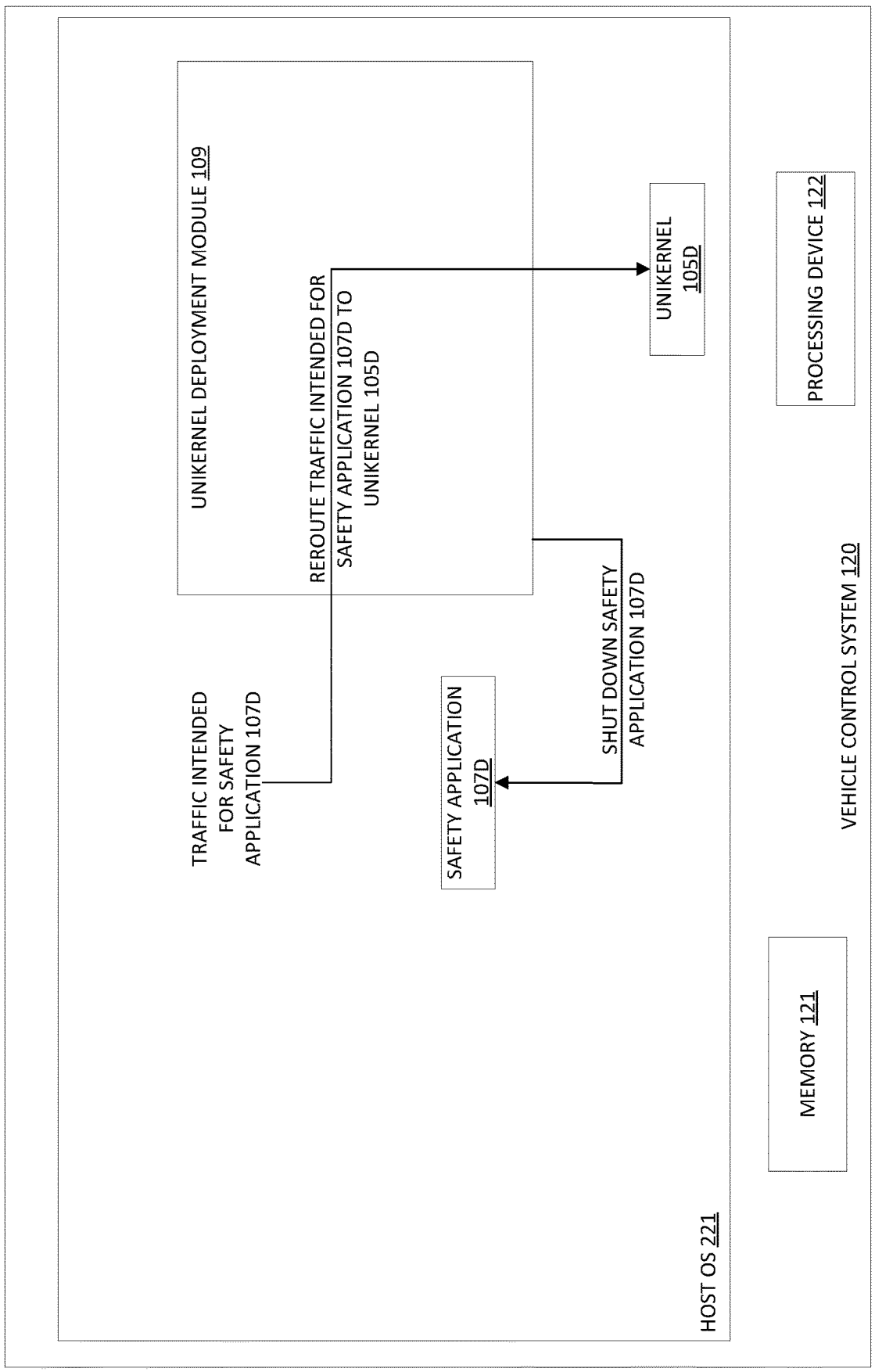
FIG. 4 is a detailed block diagram of the vehicle illustrated in FIG. 1, illustrating a failover from a safety application to a unikernel, according to some embodiments of the present disclosure.

As shown in FIG. 4, after initiating the corresponding unikernel 105D, the unikernel deployment module 109 may perform a graceful failover from the tagged safety application 107D to the corresponding unikernel 105D. The unikernel deployment module 109 may use any appropriate method to perform the failover from the tagged safety application 107D to the corresponding unikernel 105D, which may include routing traffic intended for the tagged safety application 107D to the unikernel 105D and shutting down the tagged safety application 107D. In some embodiments, the unikernel deployment module 109 may perform an A/B-style failover from the tagged safety application 107D to the unikernel 105D.

Although the unikernel 105D can perform the functions of the safety application 107D, it may not be able to perform such functions optimally. This is because e.g., the safety application 107D may depend other safety applications 107 (e.g., on the output of other safety applications 107) to function optimally. Thus, the output of these other safety applications 107 should be considered by the safety application 107D for it to function optimally. However, because the unikernel 105D operates as a single process in a single address space, it is unable to communicate with other safety applications 107 and thus cannot communicate with these other safety applications 107 to receive their output. Because of this, it is desirable for performance of the functions of the tagged safety application 107D to be switched back to tagged safety application 107D as soon as it is feasible to do so. As a result, while the unikernel 105D is executing, the unikernel deployment module 109 may continuously monitor the level of interference by comparing the number of memory allocation collision errors that the safety application 107D has experienced in a subsequent unit of time to the first and second thresholds of the first rule to determine whether the interference event has become sustainable. When the unikernel deployment module 109 determines that the interference event has become sustainable (i.e., the interference caused by the interference event has fallen below the threshold(s) of the first rule), it may reinitialize the tagged safety application 107D and transition performance of the functions of the tagged safety application 107D back to the tagged safety application 107D.

It should be noted that although described with respect to safety applications in a vehicle control system, the embodiments of the present disclosure are not limited in this way and the techniques described herein can be used to protect applications designated as critical in any appropriate computing environment. For example, the embodiments of the present disclosure can be implemented in a surveillance camera (computing environment) to protect applications that are critical to the functioning of the surveillance camera. In another example, embodiments of the present disclosure can be implemented in a content streaming system (computing environment) to protect applications that are critical to the functioning of the content streaming system.

Figure 5:
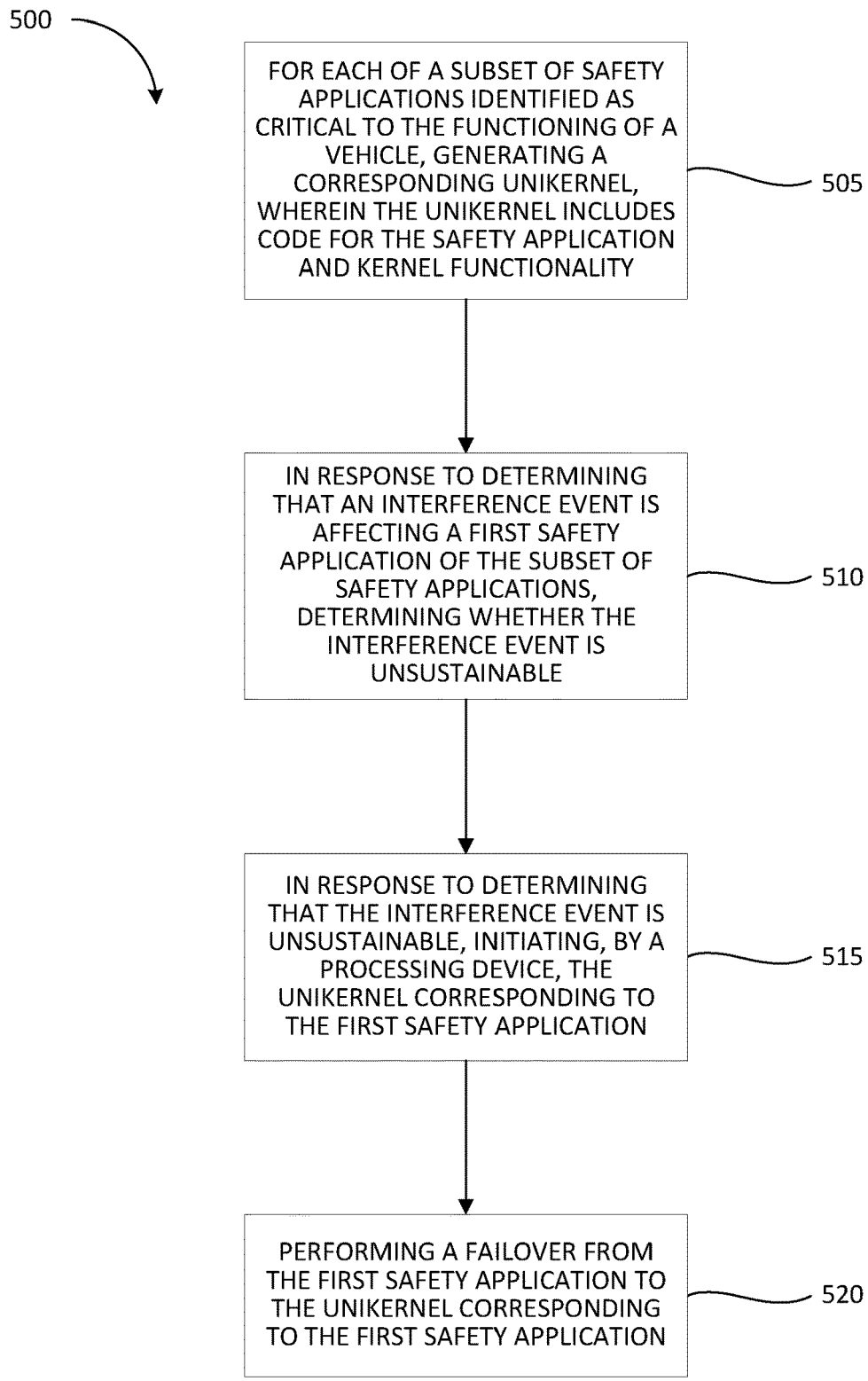
FIG. 5 is a flow diagram depicting a method of utilizing unikernel functionality to ensure that critical safety applications can execute free from interference caused by user applications or other interference sources, according to some embodiments of the present disclosure.

FIG. 5 is a flow diagram depicting a method of using unikernels to protect critical safety applications from interference events, according to some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 500 may be performed by processing device 122 (executing unikernel deployment module 109), as shown in FIGS. 2-4.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring also to FIGS. 2-4, at block 505 a user (via the tagging functionality provided by the unikernel deployment module 109) may tag safety applications 107D and 107E, identifying them as critical safety applications. In response, the unikernel deployment module 109 may generate unikernels 105D and 105E corresponding to tagged safety applications 107D and 107E respectively. The unikernel deployment module 109 may store the unikernels 105D and 105E into the unikernel registry 110. As shown in FIG. 2, there is a one-to-one mapping between tagged safety applications 107 and unikernels 105. Stated differently, for each safety application 107 that is tagged, a corresponding unikernel is generated by the unikernel deployment module 109. In some embodiments, each unikernel 105 may comply with minimum functionality requirements specified by the safety standard for the functionality of the corresponding safety application 107. For example, the tagged safety application 107D may perform a particular braking related functionality. Thus, the unikernel 105D may comply with functionality and performance requirements specified by the safety standard for the particular braking related functionality.

Often, a safety application 107 may depend on one or more other safety applications 107, each of which may in turn depend on other safety applications. In this way, the safety application 107 may be thought of as having a chain of dependencies. In some embodiments, if a safety application 107 that has a chain of dependencies is tagged as critical, the unikernel deployment module 109 may generate a unikernel based on all the safety applications in that safety application 107's chain of dependencies.

The unikernel deployment module 109 may monitor the resource usage of each safety application 107 to determine when a particular safety application 107 is experiencing an interference event. It should be noted that as used herein, an interference event may correspond to a single interference event or to a series of interference events (e.g., a series of memory allocation collision errors). The unikernel deployment module 109 may also include a rule database 106 which may include rules for determining when an interference event affecting a tagged safety application 107 is unsustainable (which in some embodiments may correspond to an infringement of a safety standard that the safety applications 107 are part of). Each of the rules in the rule database 106 may comprise magnitude and/or frequency threshold(s) associated with a type of interference event. As discussed herein, an interference event can correspond to interference with an application's usage of any type of system resource (e.g., processing, memory, networking resources).

It is desirable to avoid "false alarm" situations where, instead of being caused by a user application 108 or malicious user, an interference event is caused by a system error such as bad timing of a scheduler resulting in a scheduling overlap between two applications attempting to access a system resource. Interference events caused by system errors often are associated with lower levels of interference that will not impact a safety application 107 or levels of interference that a safety application 107 can recover from. Thus, interference events caused by system errors often do not require instantiation of a unikernel. However, the use of rules that employ a single threshold may not provide sufficient sensitivity to identify the distinction between interference events caused by system errors and those caused by a user application 108 or a malicious user. Thus, in some embodiments, each rule in the rule database 106 may include multiple thresholds corresponding to different interference levels. For example, if an interference event affecting a tagged safety application 107 exceeds only a first threshold of a rule, this may indicate an interference event where the level of interference may not affect the tagged safety application 107 or where the level of interference is such that the tagged safety application 107 can recover. If, however, the interference event affecting the tagged safety application 107 exceeds a second threshold of the rule, this may indicate an interference event having a level of interference that may compromise the functioning of the tagged safety application 107 (e.g., the tagged safety application 107's ability to access resources) and that the tagged safety application 107 cannot recover from. Thus, in response to determining that the interference event affecting the tagged safety application 107 exceeds the second threshold of the rule, the unikernel deployment module 109 may initiate a unikernel 105 corresponding to the tagged safety application 107, as discussed in further detail herein. It should be noted that each rule may any appropriate number of thresholds which may be different than the number of thresholds utilized by other rules.

The unikernel deployment module 109 may also adjust the sensitivity of the threshold(s) for each or a subset of the rules. Such adjustments may be made based on a number of factors including historical driving patterns of the vehicle, the current conditions of the vehicle (e.g., driving in rain, driving on a steep road), and current traffic conditions. Sensitivity adjustments can be applied on a per car, per scenario basis. In some embodiments, the sensitivity of the threshold(s) for each or a subset of the rules can be adjusted remotely by the cloud service 130. For example, the cloud service 130 can receive information regarding geolocation specific conditions such as traffic, weather, or other conditions. Based on this, the cloud service 130 can remotely update the sensitivity of the threshold(s) for one or more rules in the rule database 106. In another example, the cloud service 130 can receive information indicating a certain brand of vehicle has been the target of intrusion attacks by malicious users at a much higher rate over the past e.g., 24 hours. If the vehicle is of the certain brand, the cloud service 130 may update the sensitivity of the threshold(s) for one or more rules in the rule database 106 correspondingly (e.g., may lower the thresholds to implement a stricter standard).

At block 510, in response to determining that the safety application 107D is experiencing an interference event, the unikernel deployment module 109 may determine if the interference event is unsustainable. In the example of FIG. 3, the application 108D may begin interfering with the memory usage of safety application 107D (which has been tagged as discussed herein) such that the safety application 107D experiences a large number of memory allocation collision errors. The unikernel deployment module 109 may compare the number of memory allocation collision errors that the safety application 107D has experienced in a particular unit of time to a first rule of the rule database 106 that specifies first and second thresholds for number of memory allocation collision errors that may occur within the particular unit of time. The unikernel deployment module 109 may determine that the safety application 107D has experienced a number of memory allocation collision errors within the particular unit of time that exceeds both the first and second thresholds of the first rule, and thus is experiencing an interference event that is unsustainable.

At block 515, in response to determining that the safety application 107D is experiencing an interference event that is unsustainable, the unikernel deployment module 109 may initiate the corresponding unikernel 105D. In some embodiments, initiating the unikernel 105D may include downloading it from the unikernel registry 110, and installing/executing it on the host OS 221.

At block 520, after initiating the corresponding unikernel 105D, the unikernel deployment module 109 may perform a graceful failover from the tagged safety application 107D to the corresponding unikernel 105D. The unikernel deployment module 109 may use any appropriate method to perform the failover from the tagged safety application 107D to the corresponding unikernel 105D, which may include routing traffic intended for the tagged safety application 107D to the unikernel 105D and shutting down the tagged safety application 107D. In some embodiments, the unikernel deployment module 109 may perform an A/B-style failover from the tagged safety application 107D to the unikernel 105D.

Although the unikernel 105D can perform the functions of the safety application 107D, it may not be able to perform such functions optimally. This is because e.g., the safety application 107D may depend other safety applications 107 (e.g., on the output of other safety applications 107) to function optimally. Thus, the output of these other safety applications 107 should be considered by the safety application 107D for it to function optimally. However, because the unikernel 105D operates as a single process in a single address space, it is unable to communicate with other safety applications 107 and thus cannot communicate with these other safety applications 107 to receive their output. Because of this, it is desirable for performance of the functions of the tagged safety application 107D to be switched back to tagged safety application 107D as soon as it is feasible to do so. As a result, while the unikernel 105D is executing, the unikernel deployment module 109 may continuously monitor the level of interference by comparing the number of memory allocation collision errors that the safety application 107D has experienced in a subsequent unit of time to the first and second thresholds of the first rule to determine whether the interference event has become sustainable. When the unikernel deployment module 109 determines that the interference event has become sustainable (i.e., the interference caused by the interference event has fallen below the threshold(s) of the first rule), it may reinitialize the tagged safety application 107D and transition performance of the functions of the tagged safety application 107D back to the tagged safety application 107D.

Figure 6:
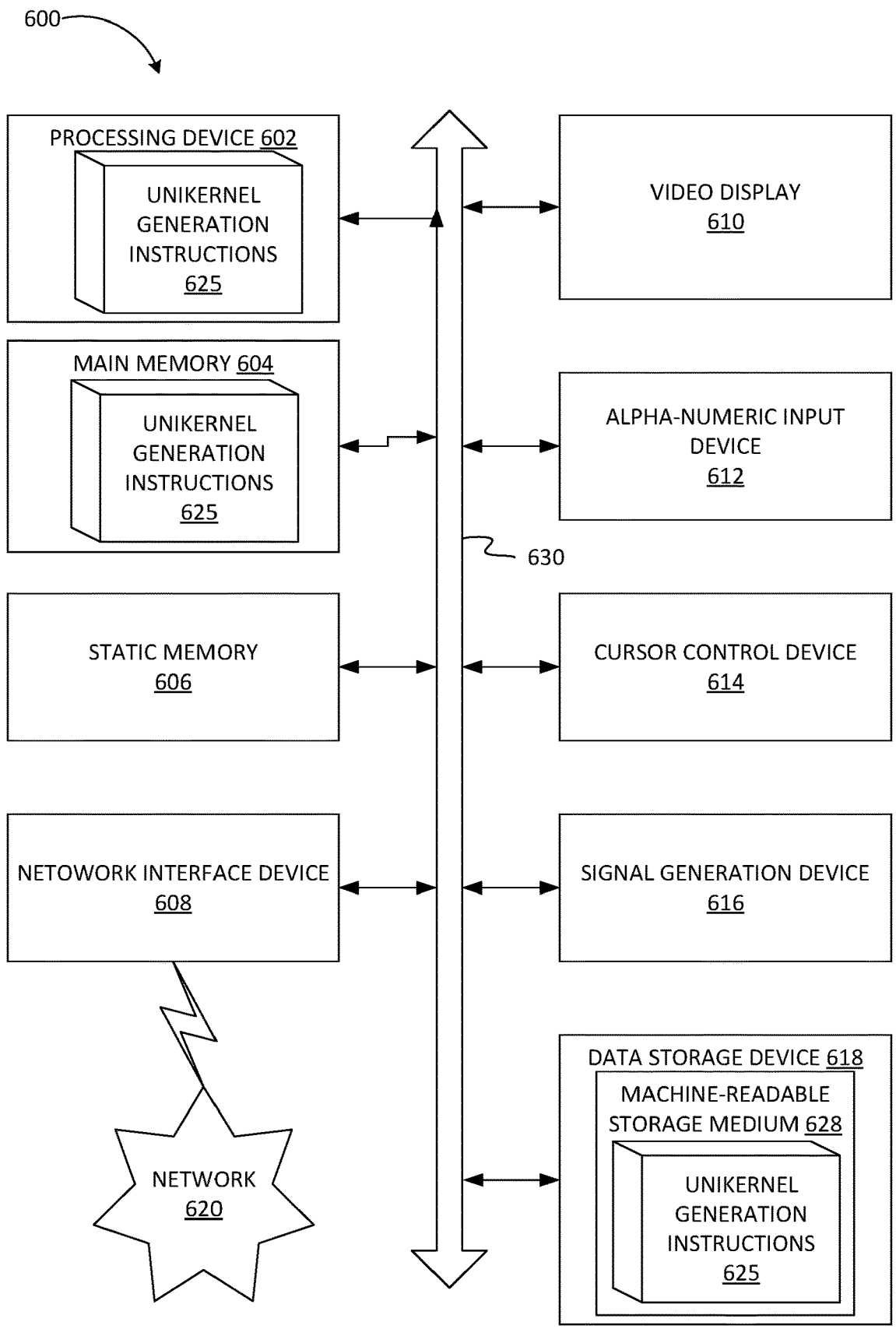
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of unikernel generation instructions 625 that may include instructions for one or more components, agents, and/or applications (e.g., safety applications 107, user applications 108, unikernel generation module 109 in FIG. 2) for carrying out the operations described herein, in accordance with one or more aspects of the present disclosure. Unikernel generation instructions 625 may also reside, completely or at least partially, within main memory 604 and/or within processing device 602 during execution thereof by computing device 600, main memory 604 and processing device 602 also constituting computer-readable media. The Unikernel generation instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "allocating," "detecting," "migrating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

for each of a set of applications identified as critical to a functioning of a computing environment, generating a corresponding unikernel, wherein the unikernel includes code of the application and kernel functionality;

in response to determining that an interference event is affecting a first application of the set of applications, determining that the interference event is unsustainable based on memory allocation collision errors within a period of time exceeding a threshold, wherein the interference event includes interference with the first application utilizing system resources by a second application, wherein the first application is a safety application of a control system associated with the computing environment, wherein the computing environment is a vehicle control system of a vehicle;

adjusting one or more of a set of thresholds associated with a frequency of a type of interference event and a set of thresholds associated with a magnitude of the type of interference event based on historical driving patterns of the vehicle and current driving conditions of the vehicle;

in response to determining that the interference event is unsustainable, initiating, by a processing device, the unikernel corresponding to the first application; and performing a failover from the first application to the unikernel corresponding to the first application.

2. The method of claim 1, further comprising:
tagging each of the set of applications as critical to generate the set of applications identified as critical.

3. The method of claim 1, further comprising:
monitoring each of the set of applications to determine that an interference event is affecting any of the tagged applications.

4. The method of claim 1, wherein determining that the interference event affecting the first application is unsustainable comprises:
comparing the interference event to a first rule of a set of rules to determine that the interference event affecting the first application is unsustainable, wherein each of the set of rules includes one or more of: the set of thresholds associated with the frequency of the type of interference event and the set of thresholds associated with the magnitude of the type of interference event.

5. The method of claim 4, wherein the first rule comprises:
a first threshold corresponding to a level of interference that will not affect the first application or a level of interference that the first application can recover from; and
a second threshold corresponding to a level of interference that will affect the first application and that the first application cannot recover from.

6. The method of claim 1, wherein performing the failover comprises:
routing traffic directed to the first application to the unikernel corresponding to the first application; and
shutting down the first application.

7. A system comprising:
a memory; and
a processing device operatively coupled to the memory, the processing device to:
for each of a set of applications identified as critical to a functioning of a computing environment, generate a corresponding unikernel, wherein the unikernel includes code of the application and kernel functionality;
in response to determining that an interference event is affecting a first application of the set of applications, determine that the interference event is unsustainable based on memory allocation collision errors within a period of time exceeding a threshold, wherein the interference event includes interference with the first application utilizing system resources by a second application, wherein the first application is a safety application of a control system associated with the computing environment, wherein the computing environment is a vehicle control system of a vehicle;
adjust one or more of a set of thresholds associated with a frequency of a type of interference event and a set of thresholds associated with a magnitude of the type of interference event based on historical driving patterns of the vehicle and current driving conditions of the vehicle;
in response to determining that the interference event is unsustainable, initiate the unikernel corresponding to the first application; and
perform a failover from the first application to the unikernel corresponding to the first application.

8. The system of claim 7, wherein the processing device is further to:
tag each of the set of applications as critical to generate the set of applications identified as critical.

9. The system of claim 7, wherein the processing device is further to:
monitor each of the set of applications to determine that an interference event is affecting any of the tagged applications.

10. The system of claim 7, wherein to determine that the interference event affecting the first application is unsustainable, the processing device is to:
compare the interference event to a first rule of a set of rules to determine that the interference event affecting the first application is unsustainable, wherein each of the set of rules includes one or more of: the set of thresholds associated with the frequency of the type of interference event and the set of thresholds associated with the magnitude of the type of interference event.

11. The system of claim 10, wherein the first rule comprises:
a first threshold corresponding to a level of interference that will not affect the first application or a level of interference that the first application can recover from; and
a second threshold corresponding to a level of interference that will affect the first application and that the first application cannot recover from.

12. The system of claim 7, wherein to perform the failover, the processing device is to:
route traffic directed to the first application to the unikernel corresponding to the first application; and
shut down the first application.

13. A non-transitory computer-readable medium having instructions stored thereon which, when executed by a processing device, cause the processing device to:
for each of a set of applications identified as critical to a functioning of a computing environment, generate a corresponding unikernel, wherein the unikernel includes code of the application and kernel functionality;
in response to determining that an interference event is affecting a first application of the set of applications, determine that the interference event is unsustainable based on memory allocation collision errors within a period of time exceeding a threshold, wherein the interference event includes interference with the first application utilizing system resources by a second application, wherein the first application is a safety application of a control system associated with the computing environment, wherein the computing environment is a vehicle control system of a vehicle;

adjust one or more of a set of thresholds associated with a frequency of a type of interference event and a set of thresholds associated with a magnitude of the type of interference event based on historical driving patterns of the vehicle and current driving conditions of the vehicle;

in response to determining that the interference event is unsustainable, initiate, by the processing device, the unikernel corresponding to the first application; and perform a failover from the first application to the unikernel corresponding to the first application.

14. The non-transitory computer-readable medium of claim 13, wherein the processing device is further to:

tag each of the set of applications as critical to generate the set of applications identified as critical.

15. The non-transitory computer-readable medium of claim 13, wherein the processing device is further to:

monitor each of the set of applications to determine that an interference event is affecting any of the tagged applications.

16. The non-transitory computer-readable medium of claim 13, wherein to determine that the interference event affecting the first application is unsustainable, the processing device is to:

compare the interference event to a first rule of a set of rules to determine that the interference event affecting the first application is unsustainable, wherein each of the set of rules includes one or more of: the set of thresholds associated with the frequency of the type of interference event and the set of thresholds associated with the magnitude of the type of interference event.

17. The non-transitory computer-readable medium of claim 16, wherein the first rule comprises:

a first threshold corresponding to a level of interference that will not affect the first application or a level of interference that the first application can recover from; and a second threshold corresponding to a level of interference that will affect the first application and that the first application cannot recover from.

* * * * *